Nov. 3, 1953
D. R. DE BOISBLANC
2,658,180
VACUUM TUBE VOLTMETER
Filed April 10, 1950
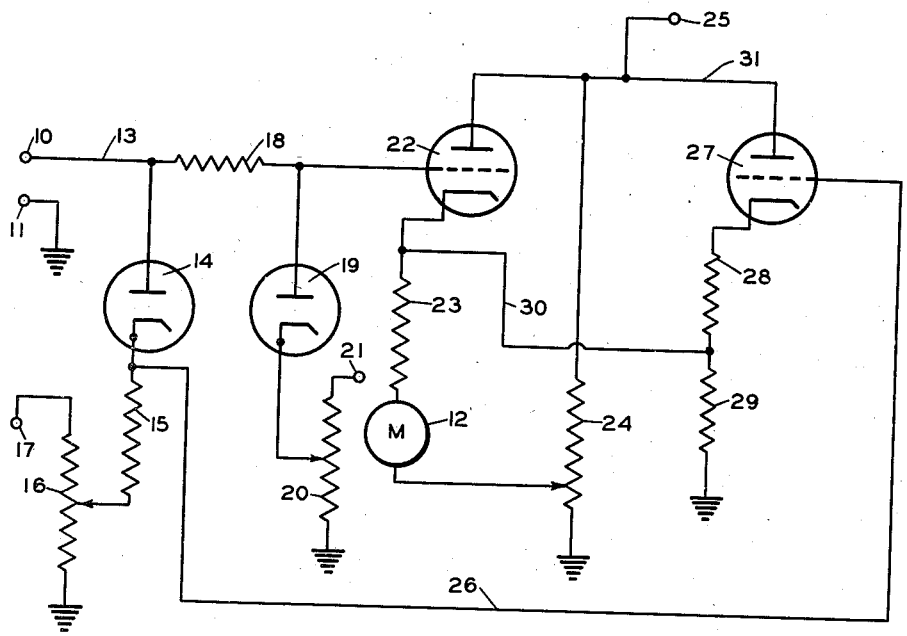
FIG. 1.
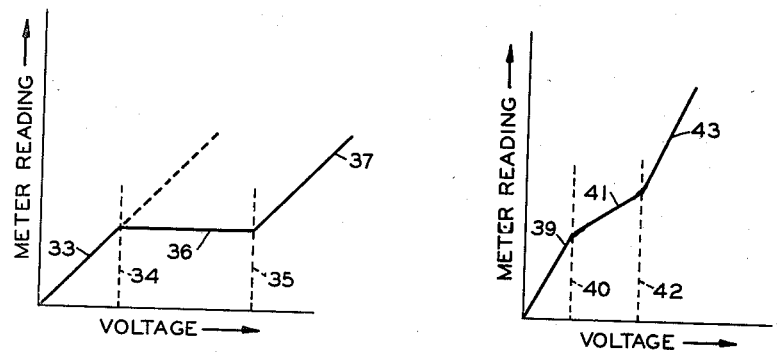
FIG. 2.
FIG. 3.
INVENTOR.
D.R. DE BOISBLANC
BY *Hudson & Young*
ATTORNEYS Patented Nov. 3, 1953

2,658,180

UNITED STATES PATENT OFFICE 2,658,180

VACUUM TUBE VOLTMETER

Deslonde R. de Boisblanc, Bartlesville, Okla., assignor to Phillips Petroleum Company, a corporation of Delaware Application April 10, 1950, Serial No. 154,928

4 Claims. (Cl. 324—123)

This invention relates to voltmeters. In one specific aspect, it relates to a voltmeter wherein applied voltages within a predetermined range produce a steady reading of the voltmeter, the voltmeter reading varying in the usual manner for voltages above and below such predetermined range.

In counting devices, such as those utilized to measure the activity of penetrating radiation, it is desirable to provide an indicator which will give a predetermined, constant reading when the count is within predetermined limits, a change in the count being shown by the indicator when the count is above or below such predetermined limits. Such an indicator is also useful in increasing the range of a voltmeter, since the portion of the range where the reading remains steady does not take up space on the voltmeter dial. The indicator of my invention is also desirable for use in connection with detonation meters to provide a constant reading for detonation levels within a predetermined allowable range of detonation, increases in detonation above that range or decreases below the range being indicated in the usual manner.

Accordingly, it is an object of the invention to provide an improved voltmeter wherein the voltmeter reading remains steady when the applied voltage is within a predetermined range.

It is a further object to provide a voltmeter which indicates values above or below such predetermined range by a variation in meter reading in the usual manner.

It is a still further object to provide apparatus of rugged construction which is reliable in operation and uses a minimum of standard circuit components.

Various other objects, advantages and features of the invention will become apparent from the following detailed description taken in conjunction with the accompanying drawings, in which:

Figure 1 is a schematic circuit diagram of the voltmeter circuit of my invention; and Figures 2 and 3 are graphs illustrating the manner in which the meter reading varies with applied voltage in preferred embodiments of the invention.

Referring now to Figure 1, a voltage to be measured is applied to input terminals 10, 11 of a circuit including a meter 12 upon which the reading is obtained. Terminal 11 is grounded and terminal 10 is connected by a lead 13 to the anode of a diode 14, the cathode of which is connected through a fixed resistor 15 to the contactor of a potentiometer 16, the fixed potentiometer terminals being connected to ground and to a positive power supply terminal 17, respectively. Lead 13 is also connected through a fixed resistor 18 to the anode of a diode 19, the cathode of which is connected to the contactor of a potentiometer 20, the fixed potentiometer terminals being connected to ground and to a positive power supply terminal 21, respectively. The junction between resistor 18 and the anode of diode 19 is connected to the control grid of a triode 22, the cathode of which is connected through a fixed resistor 23 and the meter 12 to the contactor of a potentiometer 24. The fixed terminals of this potentiometer are connected to ground and to a positive power supply terminal 25, respectively. A lead 26 connects the cathode of diode 14 with the control grid of a triode 27, the cathode of which is connected to ground through a pair of series resistors 28 and 29. The junction between resistors 28 and 29 is connected by a lead 30 to the cathode of tube 22, and the anodes of tubes 22, 27 are both connected to the power supply terminal 25 by a lead 31.

When a voltage is applied to the terminals 10, 11 which is below the predetermined range at which a steady meter reading is desired, the diodes 14, 19 are non-conductive and the voltage is applied to the control grid of tube 22, thereby regulating the current flow through the tube and meter 12 so that it is proportional to the applied voltage. This result is obtained by proper adjustment of the cathode voltages supplied to tubes 14, 19 and 22 by potentiometers 16, 20 and 24, respectively. When these conditions prevail, the meter reading is as indicated by portion 33 of the graph, Figure 2. When the applied voltage is within the range at which a steady meter reading is desired, that is, within the voltage range defined by dotted lines 34, 35 on Figure 2, diode 19 is conductive and diode 14 is non-conductive, the diode 19 first becoming conductive at the input voltage defined by line 34. This exercises a regulating action upon the control grid of tube 22 and prevents any increase in grid voltage beyond the voltage required to make diode 19 conductive. As a result, as the input voltage is increased above that represented by line 34, the potential at the control grid 22 remains constant, as indicated by the portion 36 of the graph, with the result that the anode current through tube 22 also remains constant and the meter reading is unchanged by such increases in input voltage. The voltage at which diode 19 becomes conductive is, of course, regulated by adjustment of potentiometer 20.

When the input voltage exceeds that represented by line 35, diode 14 becomes conductive with resultant increase in the potential at lead 26. As a result, the control grid of tube 27 is made more positive and this tube becomes conductive, the resultant anode current flowing through the tube passing in one path through resistor 29, and in another path through the parallel resistance defined by resistor 23, meter 12, and the portion of potentiometer 24 between its contactor and ground. This additional current flow through meter 12 causes its reading to increase as indicated by the portion 37 of the graph, Figure 2. Further increases in input voltage beyond that represented by line 35 produce corresponding increases in the voltage applied to the control grid of tube 27 and in the current flow through the meter, with the result that the meter reading is proportional to the voltage, once it becomes higher than that represented by line 35. By proper choice of the ohmic values of resistors 23, 28 and 29, the portions 33, 37 of the curve may be made parallel to each other with resultant linearity in the voltage readings obtained on the meter 12. The voltage 35 at which diode 14 becomes conductive is, of course, regulated by adjustment of potentiometer 16.

It will be apparent that I have attained the objects of my invention in providing a meter having characteristic such that the meter reading increases linearly with voltage until a first predetermined voltage is reached, as indicated by the portion 33 of the graph, Figure 2; the meter reading remaining unchanged when the voltage is within predetermined limits, as indicated by the portion 36 of the graph; and the meter reading again increasing with increase in voltage above the upper limit, as indicated by the portion 37 of the graph. By proper choice of the ohmic values of the resistances, the portions 33, 37 of the curve are made parallel with resultant linearity in the meter reading, and the portion 36 of the curve is made parallel to the voltage axis. Further, by proper adjustment of the ohmic values of the resistances and the voltages applied by potentiometers 16, 20 and 24, the characteristic shown in Figure 3 may be obtained in which figure it will be noted that the meter reading increases linearly with voltage, as indicated by the portion 39 of the graph until the lower limit 40 is reached, the meter reading then increasing less rapidly with voltage, as indicated by the portion 41 of the graph until the upper limit 42 is reached, after which, the meter reading again increases abruptly with voltage as indicated by the portion 43 of the graph. The portion 43 is not necessarily parallel with respect to the portion 39. Thus, by adjusting the parameters of the circuit, three portions may be obtained, each having any desired slope.

It will be evident that, if diode 14 and triode 27 are eliminated, the meter reading will increase linearly with voltage until the limiting voltage produced by diode 19 is reached, after which the meter reading will either remain steady or increase at a different rate upon further increases in the voltage input. There will, of course, be no further change in slope with further increase in input voltage. If diode 19 and tube 22 are eliminated, the meter reading is zero until a predetermined voltage is reached, after which the meter reading increases linearly with voltage.

While the invention has been described in connection with a present preferred embodiment thereof, it is to be understood that this description is illustrative only and is not intended to limit the invention, the scope of which is defined by the appended claims.

I claim:

1. In a voltmeter, in combination, a pair of electron tubes each having an anode, a cathode and a control grid, means for supplying operating potentials to the electrodes of said tubes, a pair of series-connected fixed resistors in the cathode circuit of the first tube, a first potentiometer having its fixed terminals connected across a source of operating potential, a fixed resistor and a meter connected in series between the cathode of the second tube and the contactor of said potentiometer, a lead connecting the cathode of said second tube to the junction between said series-connected fixed resistors, a source of voltage to be measured, a fixed resistor connecting said source of voltage to the control grid of said second tube, a second potentiometer having a voltage impressed across its fixed terminals, a first diode having its anode connected to the control grid of said second tube and having its cathode connected to the contactor of said second potentiometer, a third potentiometer having its fixed terminals connected across a voltage source, a second diode having its anode connected to said source of input voltage and having its cathode connected to the control grid of said first tube, and a fixed resistor connecting the cathode of said second diode to the contactor of said third potentiometer.

2. In a voltmeter, in combination, a pair of electron tubes each having an anode, a cathode and a control grid, the anode-cathode circuits of said tubes having a common portion, a meter connected in the common portion of said circuits, a source of input voltage to be measured, a diode, a resistor connecting the anode of said diode to said source of input voltage, a lead connecting said anode directly to the control grid of the first of said tubes, means for applying a constant predetermined potential to the cathode of said diode independently of said source of input voltage whereby said diode functions to prevent the voltage applied to the control grid of the first of said tubes from exceeding a predetermined value which is more positive than the potential applied to the cathode of said diode, a second diode having its anode connected to said source of input voltage and having its cathode connected to the control grid of the second of said tubes, and means for applying a predetermined potential to the cathode of said second diode.

3. In a voltmeter, in combination, a pair of electron tubes each having an anode, a cathode and a control grid, the anode-cathode circuits of said tubes having a common portion, a meter connected in the common portion of said circuits, a source of input voltage to be measured, means for applying said input voltage to the control grid of the first of said tubes, a diode having its anode connected to the control grid of said first tube and its cathode connected to a point of reference potential to prevent the voltage applied to the control grid of said first tube from rising above a first predetermined value which is more positive than said point of reference potential, a second diode, means for applying said input voltage to the control grid of the second of said tubes through said second diode, and means biasing said second diode to render it conductive when said input voltage exceeds a second predetermined value which is more positive than said first predetermined value.

4. In a voltmeter, in combination, a pair of electron tubes each having at least an anode, a cathode and a control grid, the anode-cathode circuits of said tubes having a common portion, a meter connected in the common portion of said circuits, a source of input voltage to be measured, means connected to said input voltage for applying a first voltage to the control grid of the first of said tubes which is a predetermined function of said input voltage, a voltage limiting circuit connected to the control grid of said first tube whereby the voltage applied to said grid does not exceed a first predetermined value, circuit means interconnecting said source of input voltage and the control grid of the second of said tubes, and means rendering said circuit means conductive when said input voltage exceeds a second predetermined value whereby a second voltage is applied to the control grid of said second tube which is a predetermined function of said input voltage, said circuit means remaining non-conductive until said input voltage exceeds said second predetermined value, said first-mentioned means being independent of said circuit means whereby said source of input voltage is connected to the control grid of the first of said tubes regardless of the value of said input voltage.

DESLONDE R. de BOISBLANC.

References Cited in the file of this patent

UNITED STATES PATENTS

| Number | Name | Date |
|---|---|---|
| 683,831 | Arcioni | Oct. 1, 1901 |
| 2,039,267 | Barber | Apr. 28, 1936 |
| 2,295,410 | Kreuzer | Sept. 8, 1942 |
| 2,378,999 | Gillespie | June 26, 1945 |
| 2,443,864 | MacAuley | June 22, 1948 |

FOREIGN PATENTS

| Number | Country | Date |
|---|---|---|
| 432,366 | Germany | Aug. 3, 1926 |
| 406,360 | Great Britain | Feb. 26, 1934 |